United States Patent [19]

Duell et al.

[11] Patent Number: 5,751,412
[45] Date of Patent: May 12, 1998

[54] DIFFRACTION VIEWING DEVICE TO AID IN AUTHENTICATING AN OPTICAL SURFACE

[75] Inventors: Graham Duell; Graeme Bullock; Daphne Flynn; Steven Martinuzzo; Belinda Stening, all of Mount Waverley; Peter Samuel Atherton, North Sydney, all of Australia

[73] Assignee: Mikoh Technology Limited, Chatswood, Australia

[21] Appl. No.: 481,278

[22] PCT Filed: Nov. 1, 1994

[86] PCT No.: PCT/AU94/00674

§ 371 Date: Aug. 17, 1995

§ 102(e) Date: Aug. 17, 1995

[87] PCT Pub. No.: WO95/12860

PCT Pub. Date: May 11, 1995

[30] Foreign Application Priority Data

| Nov. 5, 1993 | [AU] | Australia | PM2200 |
| Dec. 6, 1993 | [AU] | Australia | PM2784 |
| Dec. 6, 1993 | [AU] | Australia | PM2785 |
| Jul. 5, 1994 | [AU] | Australia | PM6630 |
| Sep. 15, 1994 | [AU] | Australia | PM8124 |

[51] Int. Cl.$^6$ .............. G06K 9/74; G06K 7/10; G03H 1/00; B42D 15/00

[52] U.S. Cl. .............. 356/71; 359/2; 235/457; 283/86; 283/91

[58] Field of Search .............. 356/71, 391, 392; 359/2; 283/86, 91; 235/457

[56] References Cited

U.S. PATENT DOCUMENTS

| 2,995,976 | 8/1961 | Weingart | 356/71 |
| 3,767,291 | 10/1973 | Johnson. | |
| 3,767,305 | 10/1973 | Craven | 356/71 |
| 3,832,038 | 8/1974 | Johnson. | |
| 4,129,382 | 12/1978 | Greenaway | 356/71 |
| 4,433,437 | 2/1984 | Fantone | 235/457 |
| 4,544,266 | 10/1985 | Antes | 356/71 |
| 4,647,143 | 3/1987 | Yamazaki et al. | 350/3.71 |
| 5,306,899 | 4/1994 | Marom et al. | 235/382 |
| 5,426,520 | 6/1995 | Kakae et al. | 283/86 |

FOREIGN PATENT DOCUMENTS

| 25 08 889 A1 | 9/1976 | Germany. | |
| 1426605 | 7/1973 | United Kingdom | 356/71 |
| WO 94/06097 | 3/1994 | WIPO. | |

*Primary Examiner*—Frank G. Font
*Assistant Examiner*—Jason D. Viena-Eisenberg
*Attorney, Agent, or Firm*—Fitch, Even, Tabin & Flannery

[57] ABSTRACT

A viewing device to aid in authenticating an optical surface. The device includes a laser diode which produces a beam of light. The device includes a viewing screen which receives a diffracted image produced by the beam illuminating the surface. The device further includes a lens system which causes the diffracted beam to be focused on the viewing screen.

19 Claims, 2 Drawing Sheets

DIFFRACTION VIEWING DEVICE TO AID IN AUTHENTICATING AN OPTICAL SURFACE

TECHNICAL FIELD

The present invention relates to devices to aid in authenticating a diffraction surface attached to an object, to thereby aid in authenticating and identifying the origin of the object.

BACKGROUND OF THE INVENTION

The present invention relates to optical authentication and identification technology and more particularly but not exclusively to the application thereof to credit and security cards, bank notes, cheques, and products of various types. More particularly, the present invention relates to devices to aid in authentication and identification of diffraction surfaces.

Diffracted images can be used to confirm visually (as well as electronically) the authenticity of a diffraction surface. A disadvantage of using a collimated laser beam to produc such diffracted images is that such a beam may not produce sharp, clear diffracted images and may not provide the ability to differentiate between a genuine optically diffractive surface and a counterfeit surface produced from a genuine surface by a process of holographic remastering (sometimes known as holographic reorigination).

OBJECT OF THE INVENTION

It is the object of the present invention to overcome or substantially ameliorate the above disadvantage.

SUMMARY OF THE INVENTION

There is disclosed herein a viewing device to aid in authenticating an optical surface, which surface is adapted to produce a projected image from an incident light beam, said device comprising;

a base;

a laser light source mounted on the base to provide a light beam and to project the light beam along a predetermined path, said laser light source being provided to illuminate said optical surface to produce a diffracted beam;

an image surface mounted on said base to receive said diffracted beam from said optical surface so that the projected image is received on said image surface and may be viewed by an observer; and an optical lens system positioned along said path said configured so as to focus said beam on said image surface if a mirror is placed along said path, in a preferred position of said optical surface, to direct said beam at said image surface.

Preferably the image surface is provided by an image member through which light can pass, so that said image can be observed on said member from either side thereof.

BRIEF DESCRIPTION OF THE DRAWINGS

Preferred embodiments of the present invention will now be described by way of non-limiting example with reference to the accompanying drawings, wherein.

Figure 3:
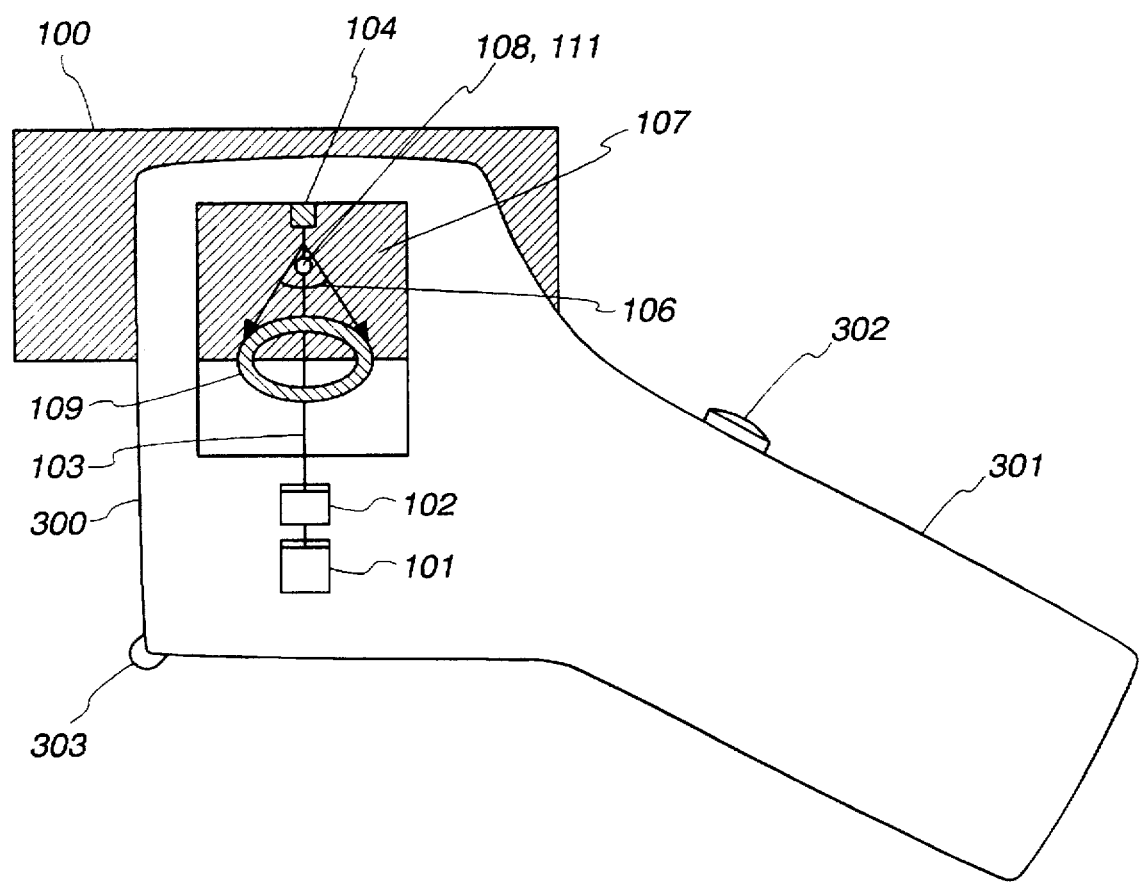
FIG. 3 is a schematic illustration of a hand held viewing device incorporating the viewing technique employed in the apparatus of FIG. 1.

It should be noted that the laser diode and lens system shown in FIGS. 1 and 3 are internal components which are included in the figures for clarity of explanation.

DESCRIPTION OF PREFERRED EMBODIMENTS OF THE INVENTION

Figure 1A:
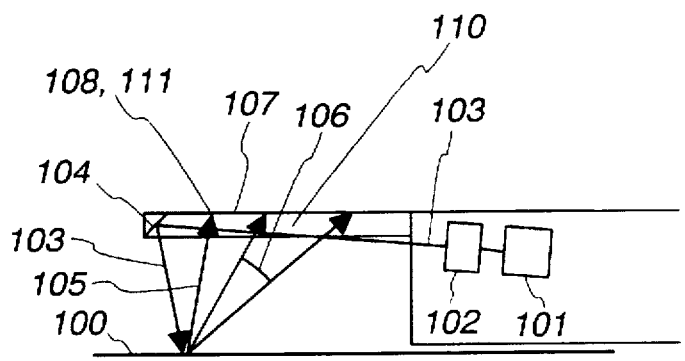
FIGS. 1a and 1b are schematic illustrations of a viewing apparatus.
Figure 1B:
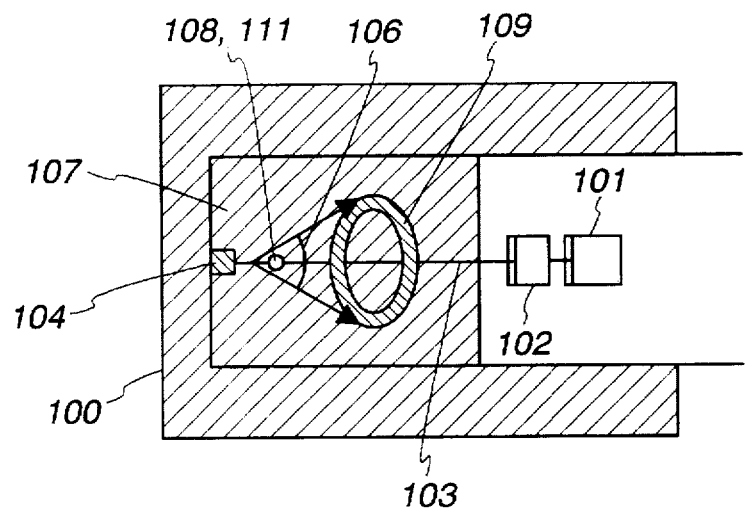

In FIG. 1 there is a schematically illustrated (in side elevation of FIG. 1(a) and in top view in FIG. 1(b)) a device for viewing an optical surface 100. The optical surface 100 is designed to produce projected images, when correctly illuminated, via a process of optical diffraction.

The output of a laser diode 101 is passed through a lens system 102 to produce a beam of light 103. The beam 103 is reflected by a mirror 104 onto the optical surface 100. The mirror 104 is used in order to enable convenient location and housing of the laser 101 and lens system 102 while also enabling an optimum angle of incidence—in this case slightly off perpendicular—of the beam 103 onto the optical surface 100.

The optical surface 100 causes specular reflection of part of the incident beam 103 into the beam 105, and diffraction of part of the incident beam 103 into the diffracted beam 106. The mirror 104 is positioned such that the beam 103 is not perpendicular to the optical surface 100, thereby creating an angular separation between the incident beam 103 and specular reflection beam 105.

The beams 105 and 106 are intercepted by a viewing screen 107. The reflected beam 105 produces a spot of light 108 at the viewing screen (image receiving member) 107, while the diffracted beam 106 produces one or more images 109 (depending on the design of the optical surface 100) at the viewing screen 107. In FIG. 1 a single image 109 is shown. Both the spot of light 108 and the image 109 can be viewed from above the viewing screen 107, for example from the position 110. The optimum viewing position for the image 109 is one in which an observer at position 110 is looking approximately back along the diffracted beam 106, as illustrated in FIG. 1. It should be noted that the optical surface 100 may produce diffracted beams other than the beam 106 and hence diffracted images other than the image 109—for example the optical surface 100 will typically produce a conjugate image to the image 109 and higher order diffraction images. However in the configuration illustrated in FIG. 1 only the image 109 is intercepted by the screen 107. Since the images produced by the optical surface 100 are usually produced in conjugate pairs, commonly the screen 107 will be configured to receive images only within a portion of the half-plane above (and parallel to) the optical surface 100. The viewing screen 107 will preferably be designed to scatter the diffracted beam 106 such that the image 109 can be viewed over a range of viewing angles from either side of the viewing screen 107. The viewing screen may be capable of passing light and may be frosted to provide light scatter.

The viewing apparatus illustrated in FIG. 1 may be hand held and therefore may not be located against the optical surface 100. Positioning of the image 109 on the viewing screen 107 is governed by the relative orientation of the viewing apparatus and optical surface 100. An alignment dot 111 is included on the viewing screen 107 to assist in aligning the viewing apparatus relative to the optical surface 100, such that the correct alignment is achieved when the spot of light 108 falls on the alignment dot 111.

Correct focusing of the light beam 103 is important in achieving a sharp diffracted image 109 at the viewing screen 107. The lens system 102 should preferably be configured such that when the optical surface 100 is replaced by a plane mirror, the beam 103 is brought to a focus at the viewing screen 107. It should be appreciated that the viewing apparatus illustrated in FIG. 1 may be part of a hand held device, and hence the distance of the apparatus from the optical surface 100 may be variable. In this case a range of operating distances between viewing apparatus and optical surface should be defined, and the lens system 102 should be configured such that when the optical surface 100 is replaced by a plane mirror, the beam 103 is brought to a focus at the viewing screen 107 for the maximum such operating distance. For distances greater than this maximum operating distance the image 109 will become larger and less well defined (i.e. increased ratio of edge definition to image size), and will therefore appear noticeably degraded. For distances less than this maximum operating distance the image 109 will become smaller and less well defined, but the size reduction will tend to mask the loss of image definition, so that to the naked eye the image will still appear acceptable.

Figure 2:
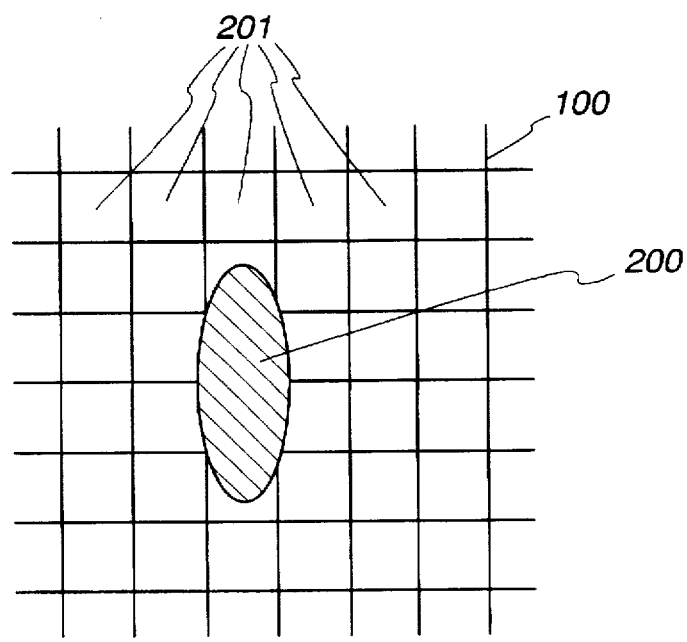
FIG. 2 is a schematic illustration of the spot of light produced at an optical surface by a preferred embodiment of the viewing apparatus of FIG. 1.

The beam 103 will produce a spot of light at the optical surface 100. FIG. 2 is a schematic illustration of this spot of light 200 at the optical surface 100 as viewed from above the surface 100. Due to the properties of the laser diode 101 the spot of light 200 will commonly be elliptical in shape, unless corrective optics are used in the lens system 102. In some embodiments the optical surface 100 may be made up of a repetitive pattern of basic cells 201, as illustrated in FIG. 2, with each cell 201 including an optical surface design to produce the diffracted image 109. In FIG. 2 the cells 201 are square in shape, although it should be appreciated that other cell shapes are possible. In such embodiments the elliptical spot 200 will preferably be such that the lengths of one or both of the axes of the ellipse are comparable with a characteristic dimension of the cells 201. FIG. 2 illustrates a typical example wherein the elliptical spot 200 is aligned with the cells 201, and the length of the short axis of the ellipse is comparable with the side length of the square cells 201. Such a condition may be important in ensuring that cells from no more than one row or column are fully illuminated at any one time.

In order to achieve both the focusing conditions for the beam 103 and the required geometry for the spot 200 at the optical surface 100, it may be necessary either to place the lens system 102 close to the laser 101 or to aperture the beam 103, or both.

The viewing apparatus illustrated in FIG. 1, preferably incorporating the optical conditions described in relation to FIG. 2, may be incorporated into a hand held device as illustrated schematically in FIG. 3, which shows such a device as viewed from above. The laser 101, lens system 102, mirror 104 and viewing screen 107 (including the alignment dot 111) are incorporated into the head of the hand held viewing device 300. Batteries to power the laser (and any associated electronics, including for example a surge protection circuit) may be housed in the handle 301 of the device 300. An "ON/OFF" button 302 located on the side of the handle 301 is used to control electrical power to the laser 101 and any associated electronics. When the viewing device 300 is positioned correctly over the optical surface 100 and the laser 101 is switched on, a reflected spot 108 and one or more diffracted images 109 are produced as the viewing screen 107.

The optical surface 100 may be part of a label which also includes a bar code (or other machine readable information).

Hence the hand held viewing device 300 may preferably also includes a means to read bar codes or some other form of machine readable information.

For example, in one preferred embodiment the device 300 may include a bar code reading means, with a bar code reader head 303 incorporated into the device, for example as illustrated in FIG. 3, in such a way to allow convenient use of the device 300 as both a viewing device and a bar code reader. The bar code reading function may be operated either by the button 302 or by another separate button. The device 300 may either store the bar code information on-board for later retrieval, or display the bar code information, or output the bar code information at the time of reading via a link of some type (such a cable link, infra red link, radio frequency, etc.).

VARIATIONS ON THE PREFERRED EMBODIMENT

It should be appreciated that variations are possible on the design illustrated in FIG. 1.

For example, the laser diode 101 and optical lens system 102 may be arranged to produce an output beam 103 directed to the optical surface 100, without the need for the mirror 104.

The embodiments described herein use a planar viewing screen 107. However it should be appreciated that a curved viewing screen may be used instead to minimise distortion of the diffracted image(s) 109.

The technique described herein can be incorporated into either a hand held viewing device, as illustrated in FIG. 3, or into a desk-top viewing device. In the case of a desk-top viewing device said device may includes a means, such as a slot or receptacle of some kind, to accept the object carrying the optical surface 100 and thereby position the optical surface 100 on such object relative to the incident beam 103. For example, in the case where the optical surface 100 is applied to a card such as a desk-top viewing device may include a slot or "picture frame" corner to accept said card and aid in positioning said card such that the optical surface 100 on said card is correctly positioned relative to said incident beam 103.

We claim:

1. A viewing device to aid in authenticating an optical surface, which surface is adapted to produce a projected image from an incident light beam, said device comprising:

a base;

a laser light source mounted on the base to provide a light beam and to project the light beam along a predetermined path, said laser light source being provided to illuminate said optical surface to produce a diffracted beam;

a viewing screen mounted on said base to receive said diffracted beam from said optical surface so that the projected image is produced on said viewing screen and may be viewed by an observer, said viewing screen having an alignment portion which is to be illuminated to aid in aligning the viewing device; and an optical lens system positioned along said path and configured so as to focus said diffracted beam on said viewing screen.

2. The device of claim 1, wherein said viewing screen is provided by an image receiving member through which light can pass, so that said image can be observed on said member.

3. The device of claim 2, wherein said optical lens system is adapted to produce at said optical surface a spot of light, which spot has a predetermined geometric characteristic.

4. The device of claim 2, wherein said viewing screen is frosted.

5. The device of claim 4, wherein said device is adapted to be hand supported.

6. The device of claim 4, wherein said optical lens system is adapted to produce at said optical surface a spot of light, which spot has a predetermined geometric characteristic.

7. The device of claim 1, further including a reflective surface arranged along said path so that said path consists of a first portion extending from said light source to said reflective surface, and a second portion extending from said reflective surface to said optical surface, with said first portion being inclined to said second portion.

8. The device of claim 7, wherein said first portion is inclined to said second portion by an acute angle.

9. The device of claim 8, wherein said device is adapted to be hand supported.

10. The device of claim 1, wherein said optical lens system is adapted to produce at said optical surface a spot of light, which spot has a predetermined geometric characteristic.

11. The device of claim 10, wherein said characteristic is related to geometric properties of said optical surface.

12. The viewing device of claim 1, further including a mirror located at said optical surface to direct the beam to said viewing screen.

13. A method of forming an image on a viewing screen comprising an alignment portion, said method including the steps of:

directing a laser light beam along a predetermined path;

locating a reflective surface along said path to direct the beam to a viewing screen so that an observer can view an image appearing on the viewing screen and align the viewing device by illuminating the alignment portion; and passing the laser beam through an optical lens system to focus the image on said viewing screen.

14. The method of claim 13, wherein said reflective surface is a mirror.

15. The method of claim 13, comprising locating the reflective surface at an optical surface from which the image is produced.

16. The method of claim 13, wherein said viewing screen is comprised of a member through which light can pass and which is frosted.

17. The method of claim 13, further including the step of reflecting said beam at a first position to direct the beam to said reflective surface so that said predetermined path includes a first portion extending to said first position and a second portion extending from said first position to said reflective surface, with the first and second portions being inclined.

18. The method of claim 17, wherein said first and second portions are inclined by an acute angle.

19. The method of claim 13, wherein said image is a spot of light, which spot has a predetermined geometric characteristic on said reflective surface.

\* \* \* \* \*